US007043811B2

(12) United States Patent
Leitão et al.

(10) Patent No.: US 7,043,811 B2

(45) Date of Patent: May 16, 2006

(54) METHOD OF REMOVING STUDS

(75) Inventors: Alessandro Lourenco Leitão, Petrópolis (BR); William H. Harrison, Cleves, OH (US); Claudio J. Heinen, Petrópolis (BR)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 10/805,884

(22) Filed: Mar. 22, 2004

(65) Prior Publication Data

US 2005/0204533 A1 Sep. 22, 2005

(51) Int. Cl.
*B23P 19/04* (2006.01)
*B23P 19/00* (2006.01)

(52) U.S. Cl. .................................. 29/402.08; 29/426.1

(58) Field of Classification Search ............ 29/402.08, 29/426.4, 426.1, 426.5; 81/53.2, 459, 437; 411/373, 109, 948, 987

See application file for complete search history.

(56) References Cited

U.S. PATENT DOCUMENTS

| | | | | |
|---|---|---|---|---|
| 1,566,691 | A * | 12/1925 | Perry | 81/53.2 |
| 2,400,318 | A | 5/1946 | Rosan | 85/9 |
| 2,407,904 | A | 9/1946 | Rosan | 29/148 |
| 2,577,810 | A | 12/1951 | Rosan | 151/33 |
| 2,709,893 | A | 6/1955 | Birmann | 60/39.51 |
| 2,775,153 | A * | 12/1956 | Parhaniemi | 81/53.2 |
| 2,783,811 | A | 3/1957 | Cummaro | 151/41.73 |
| 3,104,569 | A * | 9/1963 | Davis et al. | 81/53.2 |
| 3,106,233 | A * | 10/1963 | Wolny | 81/53.2 |
| 5,241,734 | A * | 9/1993 | Brackett | 29/426.5 |
| 6,164,164 | A | 12/2000 | Dixon, Jr. | 81/53.2 |

FOREIGN PATENT DOCUMENTS

| | | |
|---|---|---|
| DE | 2 131 039 A1 | 1/1972 |
| GB | 2 383 790 A | 6/2003 |

* cited by examiner

*Primary Examiner*—John C. Hong
(74) *Attorney, Agent, or Firm*—Harrington & Smith, LLP

(57) ABSTRACT

In one embodiment of the invention, a method of removing a key ring stud assembly comprising a key ring portion and a stud, from a threaded aperture of a gas turbine engine component is disclosed. The method comprises forming a tack weld on the key ring portion of the key ring stud assembly. The method also comprises welding an extractor to the tack weld; attaching a puller to the extractor welded to the tack weld; and removing the key ring portion by pulling on the puller, wherein the stud remains in the threaded aperture. The method further comprises assembling two nuts to the stud. Advantageously, the stud may be removed using a wrench or other suitable tool without damaging the threaded aperture of the gas turbine engine component.

10 Claims, 6 Drawing Sheets

METHOD OF REMOVING STUDS

FIELD OF THE INVENTION

The present invention relates to a method of removing studs from gas turbine engine components and, more particularly, to a method of removing key ring stud assemblies from gas turbine engine components.

BACKGROUND OF THE INVENTION

Threaded studs are used very extensively in the aerospace field. The stud is secured to a workpiece by a threaded first end threaded into a threaded aperture in the workpiece. A threaded second end protrudes from a surface of the workpiece wherein the second end is used to secure another part to the workpiece.

It is often necessary to remove the studs from the workpiece. For example, the turbine rear frame of the CF6-80C2 and CF6-80E engines have multiple key ring stud assemblies installed on the aft flange hub. The studs may need to be removed when a heat treatment operation is performed on the turbine rear frame. Similarly, these studs may need to be removed if an unserviceable condition is found on a stud during an inspection process.

One method of removing studs from a turbine rear frame is set forth in FIG. 1. As shown therein, a portion of the stud may be cut off slightly above the surface of the hub. A machine is then set up to drill to a depth lower than the bottom of the key ring portion. A second drilling operation is then employed using a smaller sized drill to drill through the bottom the stud or to another depth suitable for application of a subsequent screw extractor. Thus, drilling is conducted through the stud using a drill sized for the particular screw extractor employed. Next, a prying tool is employed to reach under the key ring portion and remove this locking mechanism. The screw extractor with a tapered diameter then removes the remaining inner stud, as shown in FIG. 1.

Although the above method is effective, care must be taken so as not to drill into the parent material of the component. Similarly, there is a risk of damaging the threaded aperture of the component because of the use of multiple drilling operations. This method also involves multiple repair operations and equipment set up procedures and thus often demands many labor hours to complete the removal process.

Accordingly, there exists a need for a method of efficiently removing studs from gas turbine engine components, particularly key ring stud assemblies of a turbine rear frame, without damaging the underlying threaded apertures. The present invention satisfies this need.

BRIEF DESCRIPTION OF THE INVENTION

In one embodiment of the invention, a method of removing a key ring stud assembly comprising a key ring portion and a stud, from a threaded aperture of a gas turbine engine component is disclosed. The method comprises forming a tack weld on the key ring portion of the key ring stud assembly. The method also comprises welding an extractor to the tack weld; attaching a puller to the extractor welded to the tack weld; and removing the key ring portion by pulling on the puller, wherein the stud remains in the threaded aperture. The method further comprises assembling two nuts to the stud. Advantageously, the stud may be removed using a wrench or other suitable tool without damaging the threaded aperture of the gas turbine engine component.

In another embodiment of the invention, a method of removing a key ring stud assembly comprising a key ring portion and a stud, from an aperture of a workpiece is disclosed. The method comprises forming a tack weld on the key ring portion of the key ring stud assembly. The method also comprises welding an extractor to the tack weld; attaching a puller to the extractor welded to the tack weld; and removing the key ring portion by pulling on the puller, wherein the stud remains in the aperture. The method further comprises assembling two nuts to the stud, wherein a first nut is assembled to the stud and a second nut is secured on the first nut to become fixed and prevent movement of the first nut. The stud may be advantageously removed using a wrench without damaging the aperture of the workpiece.

DETAILED DESCRIPTION OF THE INVENTION

The present invention will be described with reference to the removal of a key ring stud assembly from a turbine rear frame of a gas turbine engine, as shown in the Figures. However, it is understood that the methods and apparatuses described herein may be applicable to the removal of any type of suitable studs from any desired workpiece. For example, the methods described herein are particularly suited for effectively and efficiently removing studs from many different gas turbine engine components or other workpieces.

Figure 1:
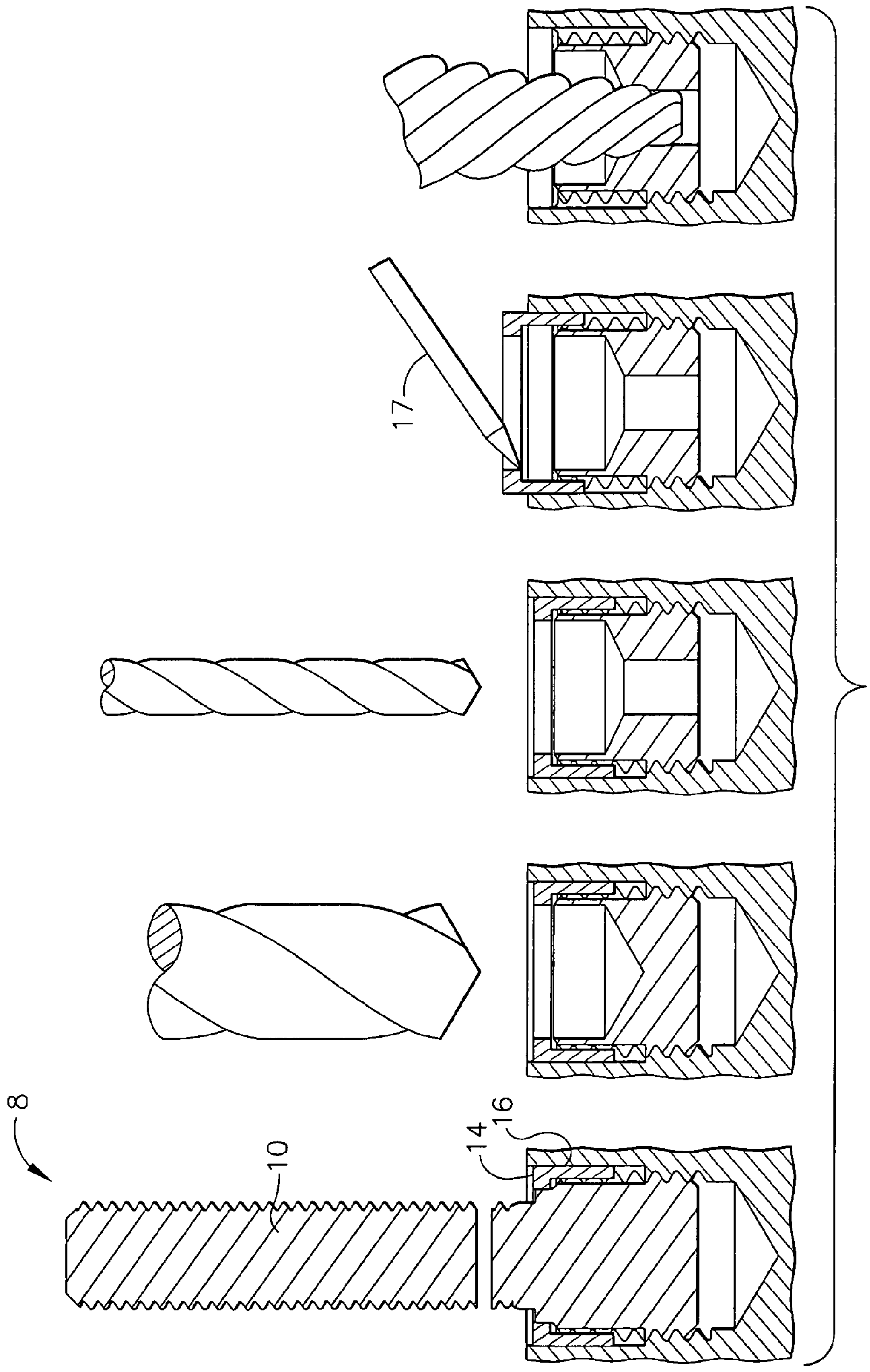
FIG. 1 (PRIOR ART)
FIG. 1 is a schematic illustration of a prior art stud removal method.
Figure 2:
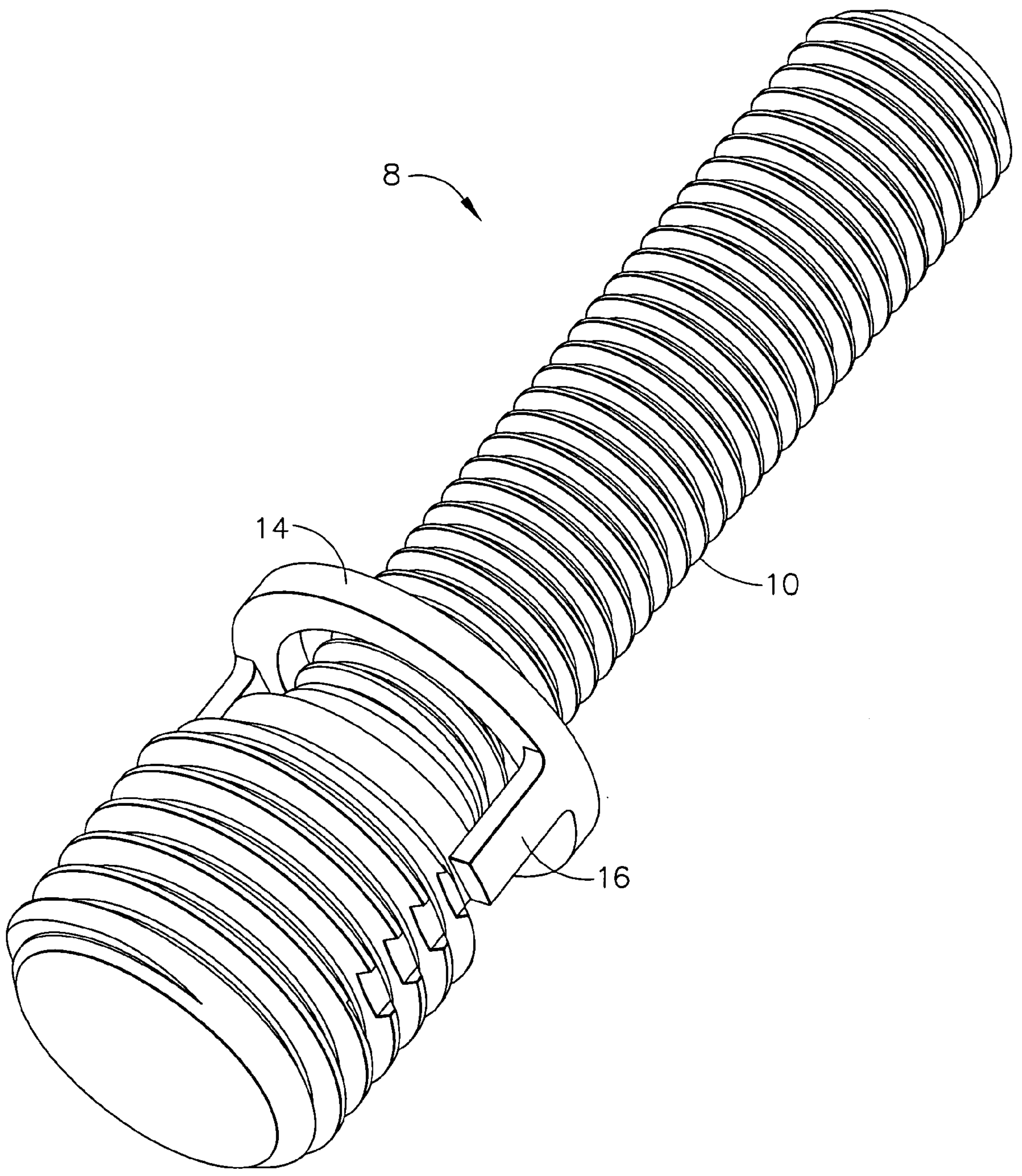
FIG. 2 is a schematic illustration of a key ring stud assembly.

A conventional key ring stud assembly 8 includes a key ring portion 14 or locking mechanism and an inner stud 10, as shown in FIG. 2. The key ring portion 14 has the general shape of a ring with two keys or protrusions 16.

Figure 3:
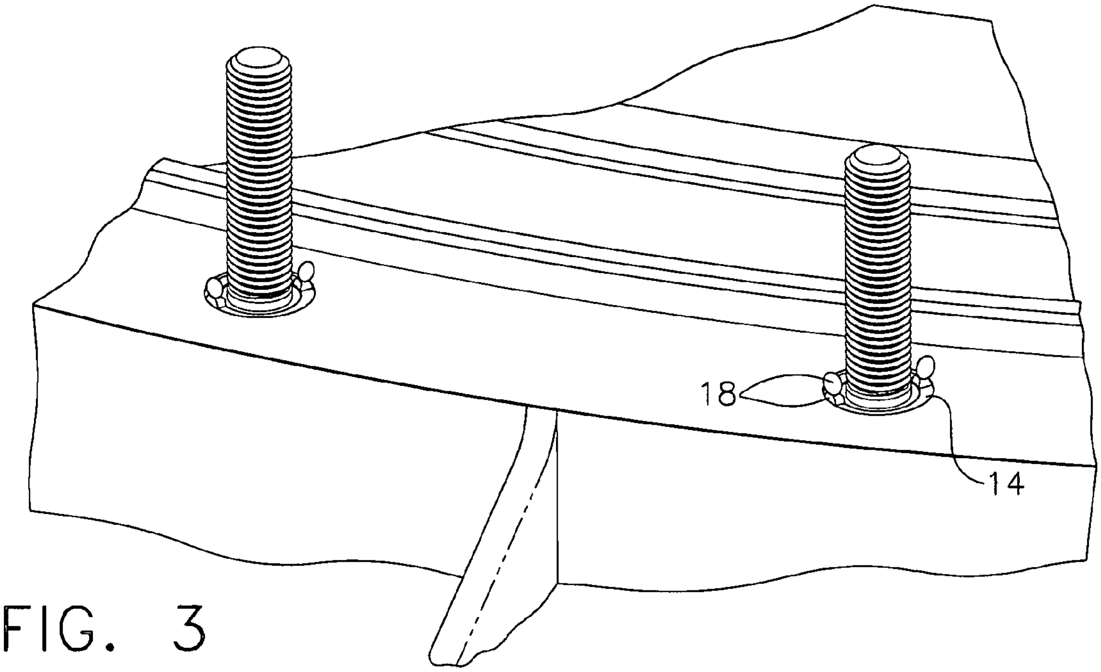
FIG. 3 is a schematic illustration of a tack weld built up on a key ring portion, in accordance with an embodiment of the invention.

Referring to FIG. 3, in accordance with an embodiment of the invention, a tack weld 18 may be built up on the key ring portion 14. Preferably, the tack weld 18 is a two point tack weld located on the key ring at the locations of the keys or protrusions 16. Any suitable welding process may be employed in the welding operation, such as gas tungsten arc welding, among others. Preferably, a weld wire is employed for controlled deposition of the tack weld on the keys 16 of the key ring portion 14. For example, a weld filler material, with the shape of wire about 1 inch (2.54 cm) in length and about 35 thousandths of an inch (0.089 cm) in diameter, among other suitable lengths and diameters, may be employed to create the weld beads on the key ring portion 14. Preferably, a weld wire made of the same material as the underlying workpiece is employed. For example, some turbine rear frames are made of Inco 718 alloy material. Thus, this material would also be preferred for use as the filler weld material. However, any suitable filler material may be employed as long as it is compatible with the material of the underlying workpiece.

During the welding process, care should be taken so that the temperature of the underlying part does not exceed its operation temperature during engine service. Preferably, the temperature should be monitored such that it does not even approach that of the underlying part's operating temperature so that metallurgical property changes are avoided. For example, in the case of some turbine rear frames, the temperature should not exceed about 500° F. (260° C.), which is about half of the expected operating temperature during engine service. Temperature control devices, such as thermocouples, may be employed to ensure that the appropriate temperature is not exceeded. Similarly, other known temperature monitoring or marking devices, which change color or melt upon reaching a particular temperature, are particularly useful. For example, Templistik temperature indicators sold by Tempil, Inc. may be employed.

Figure 4:
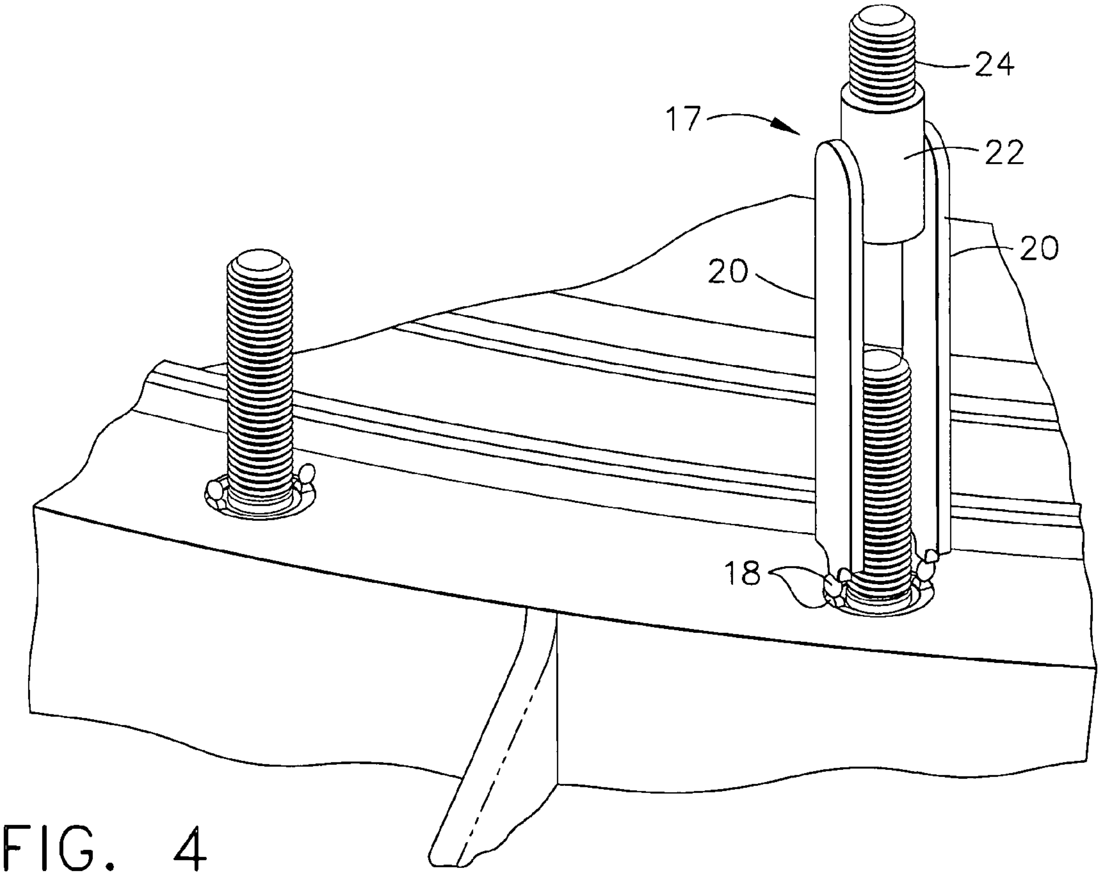
FIG. 4 is a schematic illustration of an extractor tool welded to the tack weld of FIG. 3, in accordance with an embodiment of the invention.

As shown in FIG. 4, an extractor tool 17 also referred to as an extractor, may then be welded to the tack welds using any suitable welding device and filler material, as described above. Preferably, the filler material is the same as that of the tack weld. During this welding operation, the temperature should be monitored, as also described above.

Figure 5:
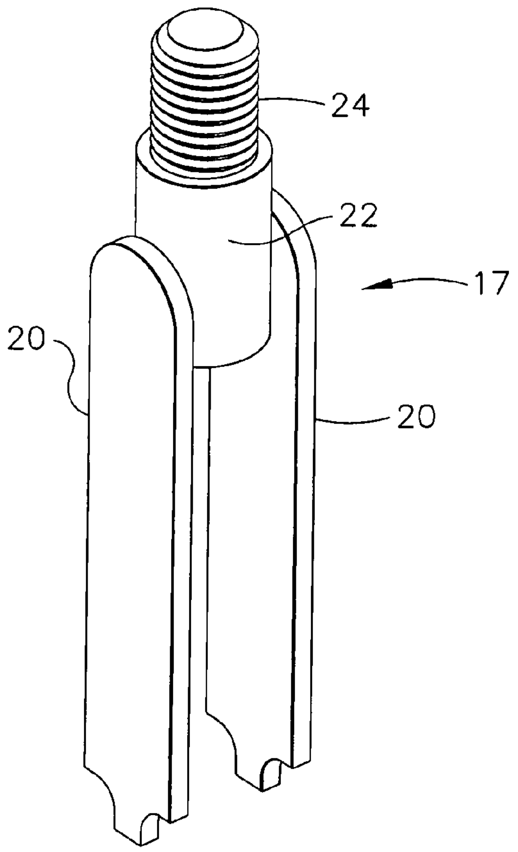
FIG. 5 is a schematic illustration of an extractor tool employed in FIG. 4.

An embodiment of the extractor tool 17 is shown in further detail in FIG. 5. The extractor tool 17 generally includes two elongated legs 20, which are the portions of the extractor tool 17 welded to the tack welds. The legs 20 are conventionally secured to a bolt 22 by any suitable securing mechanism. For example, the bolt 22 may be welded to the legs 20 or even formed as an integral part thereof. The extractor tool 17 further comprises an elongated threaded portion 24 fit within the bolt 22.

Figure 6:
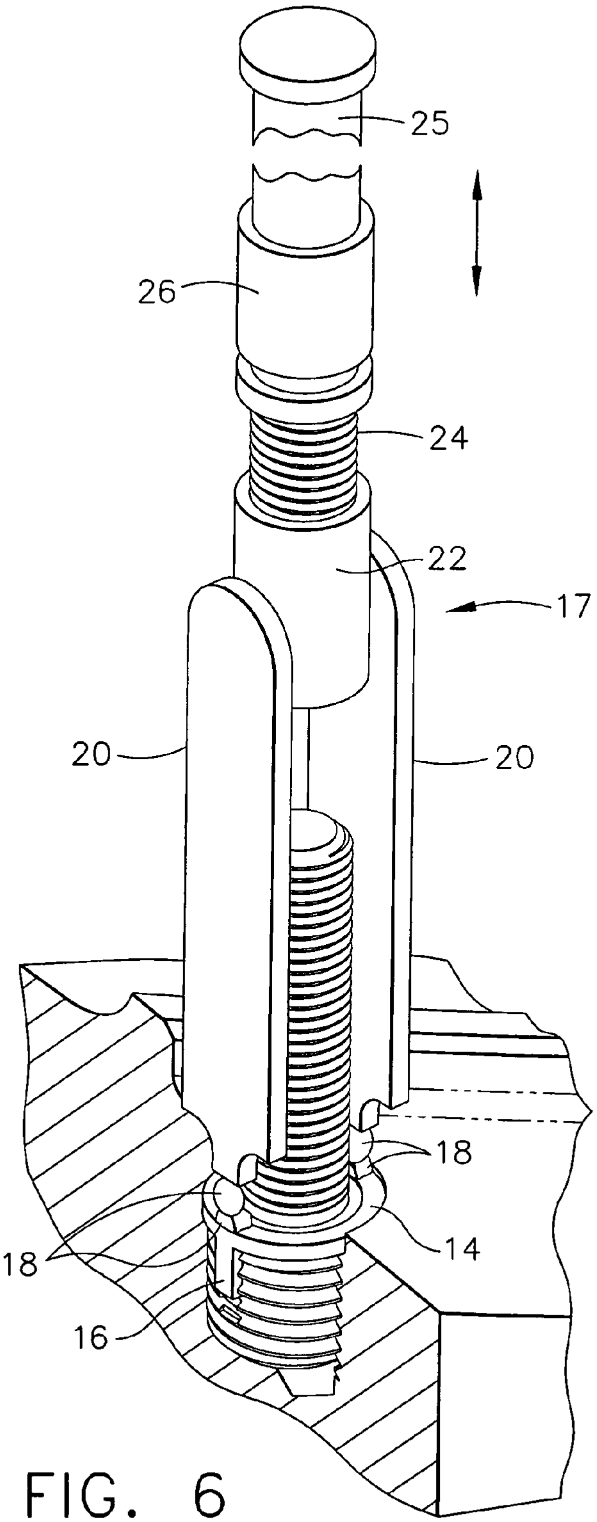
FIG. 6 is a schematic illustration of a puller attached to the extractor tool of FIG. 4, employed in an embodiment of the invention.

A puller 25, sometimes referred to as a slide hammer puller, may then be attached to the extractor tool 17, as shown in FIG. 6. The puller 25 generally comprises a rod portion 26. The elongated threaded portion 24 of the extractor tool 17 may fit within the rod portion 26 of the puller 25 for attachment thereto. Conventional lubricating oil may also be applied to the stud 10 to assist in the removal of the key ring portion 14 prior to exerting the upward pulling force on the puller 25. To remove the key ring portion 14, the puller 25 may be manually or automatically pulled in a straight, upward fashion to dislodge the key ring portion. Twisting or rotation of the device should be avoid so as not to damage the threaded aperture 32 in which the key ring stud assembly 8 is located.

Figure 7:
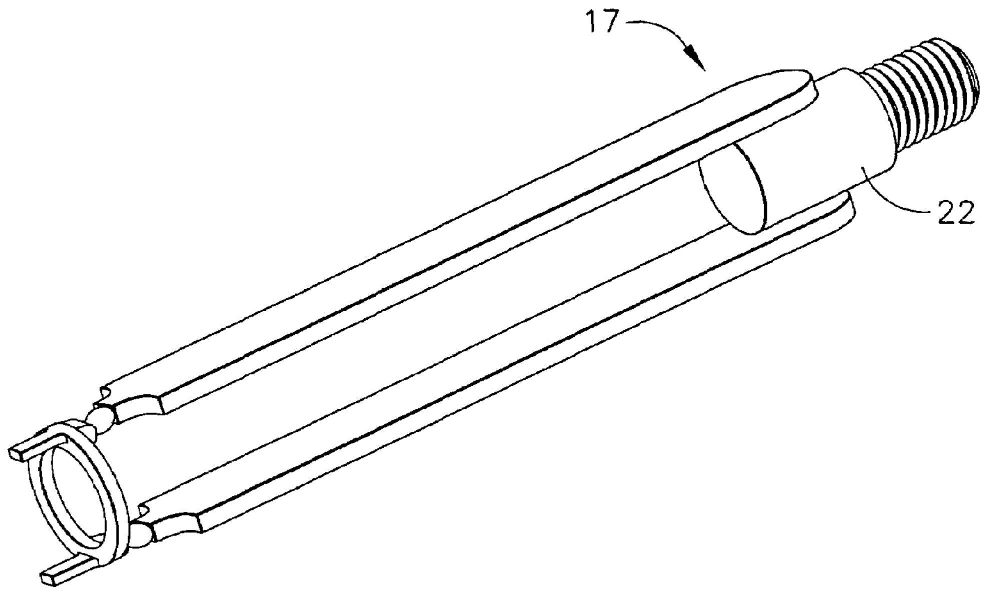
FIG. 7 is a schematic illustration of the extractor tool of FIG. 5 gripping a removed key ring portion, in accordance with an embodiment of the invention.
Figure 8:
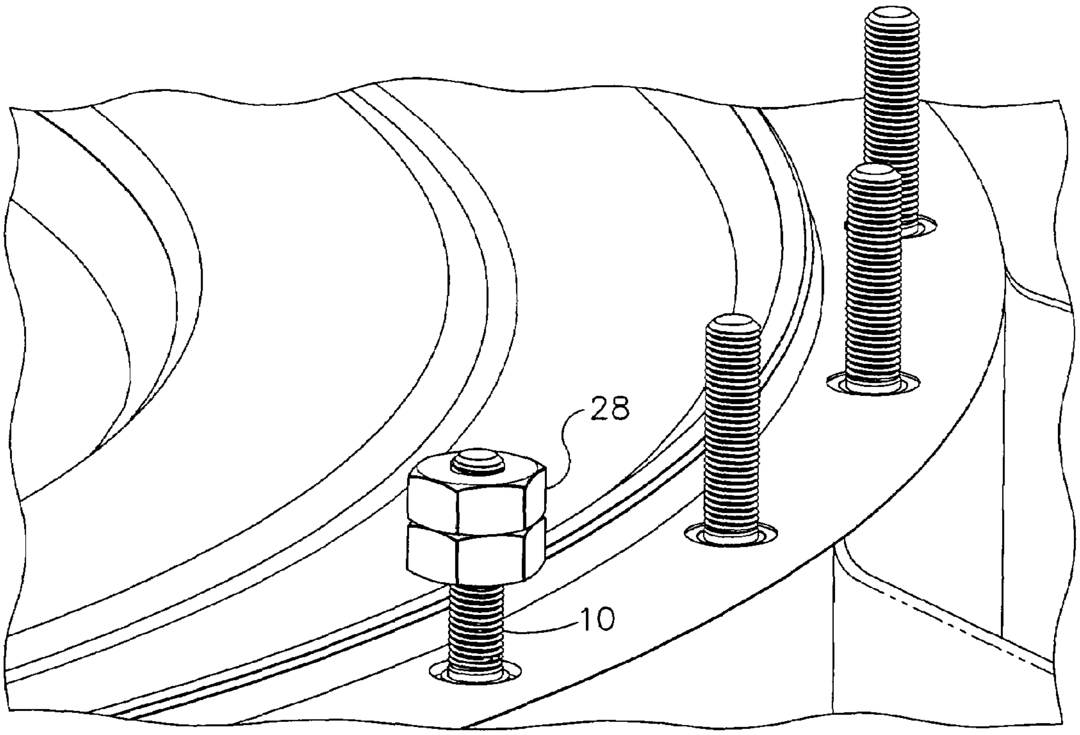
FIG. 8 is a schematic illustration of two nuts assembled to the stud threads, in accordance with an embodiment of the invention.
Figure 9:
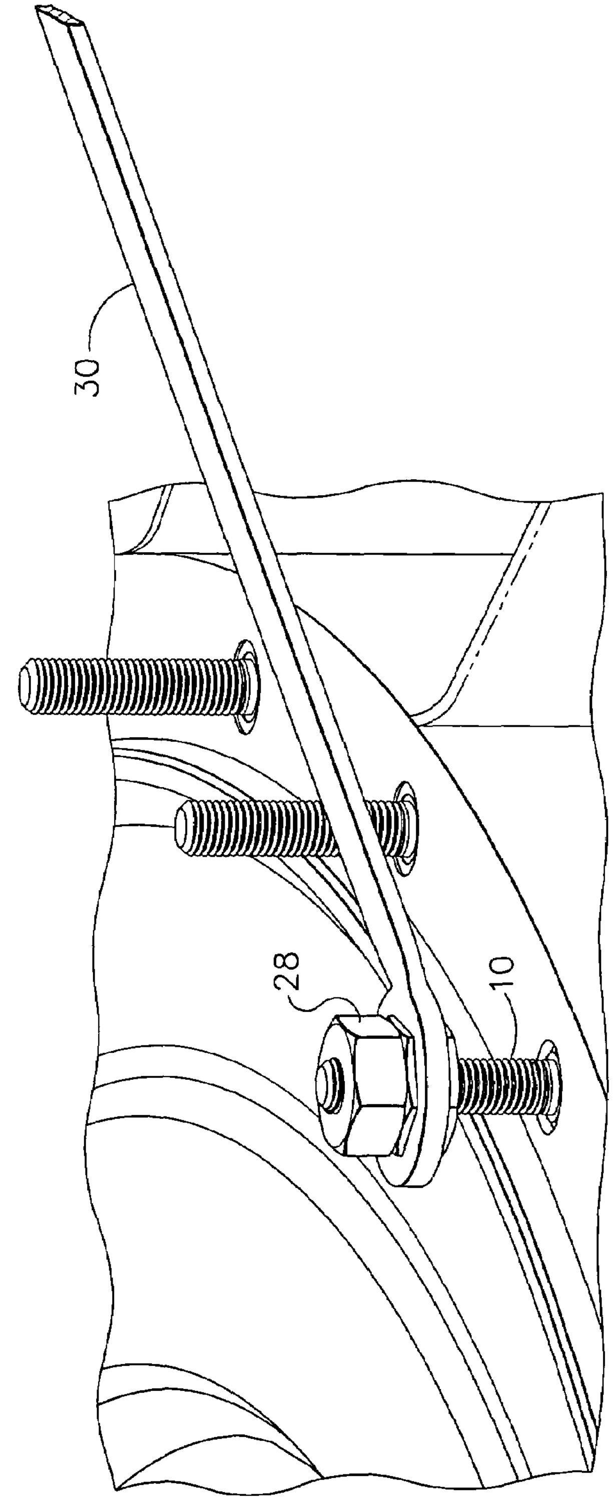
FIG. 9 is a schematic illustration of a wrench removing or screwing out the inner stud portion of FIG. 8.

The extractor tool 17, gripping the removed key ring portion 14, is shown in FIG. 7. The remaining portion of the key ring stud assembly 8, the inner stud 10, may then be efficiently removed from the threaded aperture 32. In particular, two nuts 28 are preferably assembled to the stud 10, as shown in FIG. 8. The first nut is assembled to the stud, and then a second nut is secured on the first nut so that it becomes fixed, thereby preventing the movement of the first nut. Lubricating oil may then be applied, and the inner stud portion 10 removed with a wrench 30 or other suitable tool, as shown in FIG. 9.

Figure 10:
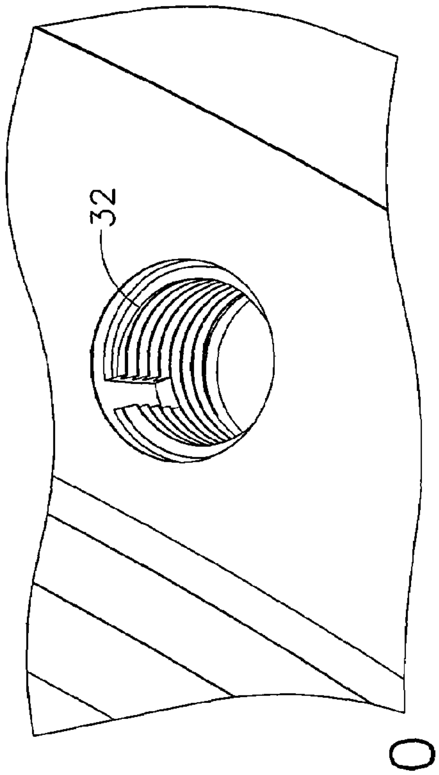
FIG. 10 is a schematic illustration of a key ring stud assembly removed from a threaded aperture without damaging the aperture, in accordance with an embodiment of the invention.

As shown in FIG. 10, the key ring stud assembly 8 is efficiently removed without damaging the underlying threaded aperture 32.

An advantage of embodiments of the present invention is the use of a welding operation in combination with an extractor tool that eliminates the necessity of using drilling operations. Thus, embodiments of the invention reduce the risk of causing damage to the underlying part, reduce the cost of the removal operation, as well as reduce the total amount of labor hours necessary to remove the studs. Moreover, extensive, precision equipment is not required.

While various embodiments are described herein, it will be appreciated from the specification that various combinations of elements, variations or improvements therein may be made by those skilled in the art, and are within the scope of the invention.

What is claimed is:

1. A method of removing a key ring stud assembly comprising a key ring portion and a stud, from a threaded aperture of a gas turbine engine component comprising:
- forming a tack weld on the key ring portion of the key ring stud assembly;
- welding an extractor to the tack weld;
- attaching a puller to the extractor welded to the tack weld;
- removing the key ring portion by pulling on the puller, wherein the stud remains in the threaded aperture;
- assembling two nuts to the stud; and
- removing the stud using a tool without damaging the threaded aperture of the gas turbine engine component.

2. The method of claim 1, wherein the gas turbine engine component is a turbine rear frame.

3. The method of claim 1, wherein filler material used in forming the tack weld is the same material as the component.

4. The method of claim 1, wherein the extractor comprises a bolt, an elongated threaded portion fit within the bolt and two legs, wherein ends of the legs are welded to the tack weld.

5. The method of claim 1, wherein the puller comprises a rod portion, and the elongated threaded portion of the extractor fits within the rod portion of the puller.

6. The method of claim 1, wherein the tack weld is a two point tack weld on keys of the key ring portion.

7. The method of claim 1, comprising attaching a wrench to a nut secured to the stud to screw out the stud.

8. The method of claim 1, wherein welding is conducted using a weld wire.

9. The method of claim 1, further comprising monitoring temperature during the welding.

10. A method of removing a key ring stud assembly comprising a key ring portion and a stud, from an aperture of a workpiece comprising:
- forming a tack weld on the key ring portion of the key ring stud assembly;
- welding an extractor to the tack weld;
- attaching a puller to the extractor welded to the tack weld;
- removing the key ring portion by pulling on the puller, wherein the stud remains in the aperture;

assembling two nuts to the stud, wherein a first nut is assembled to the stud and a second nut is secured on the first nut to become fixed and prevent movement of the first nut;

and removing the stud using a wrench without damaging the aperture of the workpiece.

* * * * *